(12) United States Patent
Finatzer

(10) Patent No.: US 9,340,358 B2
(45) Date of Patent: May 17, 2016

(54) CONVEYOR BELT SECTION

(75) Inventor: Karl Heinz Nikolaus Finatzer, Brentwood Park (ZA)

(73) Assignee: Barbara Anne Finatzer, Brentwood Park, Gauteng (ZA)

(*) Notice: Subject to any disclaimer, the term of this patent is extended or adjusted under 35 U.S.C. 154(b) by 137 days.

(21) Appl. No.: 14/118,045

(22) PCT Filed: May 16, 2012

(86) PCT No.: PCT/ZA2012/000032
§ 371 (c)(1),
(2), (4) Date: Nov. 15, 2013

(87) PCT Pub. No.: WO2012/159130
PCT Pub. Date: Nov. 22, 2012

(65) Prior Publication Data
US 2014/0069781 A1 Mar. 13, 2014

(30) Foreign Application Priority Data
May 19, 2011 (ZA) .................................. 2011/03656

(51) Int. Cl.
| | | |
|---|---|---|
| B65G 15/42 | (2006.01) | |
| B65G 15/30 | (2006.01) | |
| B65G 15/10 | (2006.01) | |
| B65G 17/02 | (2006.01) | |
| B65G 39/20 | (2006.01) | |

(52) U.S. Cl.
CPC ............... *B65G 15/30* (2013.01); *B65G 15/10* (2013.01); *B65G 15/42* (2013.01); *B65G 17/02* (2013.01); *B65G 39/20* (2013.01)

(58) Field of Classification Search
CPC ..................................................... B65G 17/10
USPC ....................... 198/820, 821, 844.1
See application file for complete search history.

(56) References Cited

U.S. PATENT DOCUMENTS

| | | | |
|---|---|---|---|
| 3,545,598 A | 12/1970 | McGinnis | |
| 3,602,549 A * | 8/1971 | Renzing et al. | 299/43 |
| 4,422,544 A * | 12/1983 | Alldredge | 198/838 |
| 4,461,378 A * | 7/1984 | Roth | 198/370.04 |
| 8,353,591 B2 * | 1/2013 | Isowa et al. | 347/104 |
| 2006/0223927 A1 * | 10/2006 | Hodjat et al. | 524/405 |

FOREIGN PATENT DOCUMENTS

| | | |
|---|---|---|
| DE | 1714776 | 1/1956 |
| DE | 1246538 | 8/1968 |
| DE | 4311863 | 8/1994 |

OTHER PUBLICATIONS

Search Report of the ISA dated Feb. 18, 2013 for PCT Application No. PCT/ZA2012/000032.
Written Opinion of the ISA dated Feb. 18, 2013 for PCT Application No. PCT/ZA2012/000032.

* cited by examiner

*Primary Examiner* — Gene Crawford
*Assistant Examiner* — Lester Rushin
(74) *Attorney, Agent, or Firm* — Haugen Law Firm PLLP

(57) ABSTRACT

A conveyor belt section (10) capable of bending vertically and horizontally includes a base (12) and side walls (14, 16) extending anguiarly from opposing sides of the base (12) to form a channel (18), wherein the belt section (10) is corrugated with at least two alternating peaks (20) and troughs (22) extending continuously across the side walls (14, 16) and base (12).

20 Claims, 5 Drawing Sheets

CONVEYOR BELT SECTION

BACKGROUND

The present invention relates to a corrugated conveyor belt section.

Partially corrugated conveyor belts are known. For instance, FIG. 1 (DE10149101) shows a belt made up of belt sections that include: (i) a single fold forming a rib that extends across the width of the belt section; and (ii) planar portions neighbouring the rib. And, FIG. 2 (same patent) shows a belt having a base made up of semi-cylindrical sections and sinusoidal side walls.

A drawback of the known belts is that their shape: (i) limits the degree to which they can bend horizontally (i.e. side-to-side) and vertically (i.e. up-and-down); and (ii) causes localised areas of stress and wear.

The corrugated conveyor belt section according to the current invention aims to address this drawback.

SUMMARY OF THE INVENTION

According to a first aspect of the present invention there is provided a conveyor belt section including:
  a base;
  side walls extending angularly from opposing sides of the base to form a channel,
wherein the belt section is corrugated with at least two alternating peaks and troughs extending continuously across the side walls and base.

Preferably, the alternating peaks and troughs are spaced axially and equidistant along the conveyor belt section.

Typically, the width of the peaks at the midline of the corrugations is substantially equal to the width of the troughs at the midline of the corrugations.

The corrugations may be sinusoidal. Alternatively, the belt portions between the peaks and troughs may be linear forming triangular corrugations.

Typically, the amplitude of the corrugations in the side walls is greater than the amplitude of the corrugations in the base.

Preferably, the conveyor belt section includes an arcuate transition section at each junction of the base and side walls wherein the amplitude of the corrugations running across the arcuate transition section increases along the arc from the base to the side walls.

Typically, the axial ends of the belt section terminate in planar, axially extending end sections.

Preferably, the end sections are located between, but spaced from the peaks and troughs.

Typically, the conveyor belt section is made from an elastomeric material.

Preferably, the base is made from an elastomeric material that is more wear resistant than the elastomeric material forming the side walls.

Generally, the side walls are made from an elastomeric material that is more resistant to fatigue than the material forming the base.

Typically, at least two conveyor belt sections are arranged with aligned end sections secured together by a securing means to form a composite conveyor belt.

Preferably, the securing means comprises a flange and bolts extending between the end sections and flange.

Optionally, the composite conveyor belt includes a closure panel at the junction of adjacent conveyor belt sections that extends between the side walls of the belt sections to inhibit or prevent material conveyed by the composite conveyor belt from moving between the channels defined by the adjacent conveyor belt sections.

These and other features, aspects and advantages of the invention will become better understood with reference to the following description and drawings.

BRIEF DESCRIPTION OF THE DRAWINGS

The invention will now be described in more detail, by way of example only, with reference to the accompanying drawings in which.

DESCRIPTION OF PREFERRED EMBODIMENTS

Figure 1:
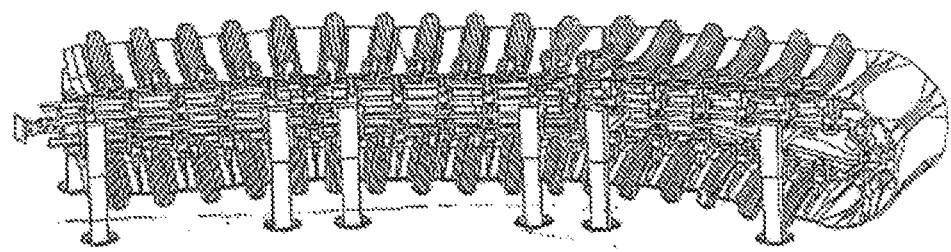
FIG. 1 is an isometric view of a prior art conveyor belt disclosed in DE10149101.

With reference to FIGS. 3 to 7 of the drawings, a conveyor belt section 10 according to the invention includes a base 12 and side walls 14 and 16 extending angularly upwards from opposing sides of the base to form a channel 18.

The side walls 14 and 16 retain material transported on the conveyor belt section 10 within the channel 18.

When in a relaxed state, the conveyor belt section 10 is corrugated, with at least two peaks 20 and two troughs 22 spaced axially and equidistant along the belt section 10 and extending continuously across the side wall 16, base 12 and side wall 14.

Figure 2:
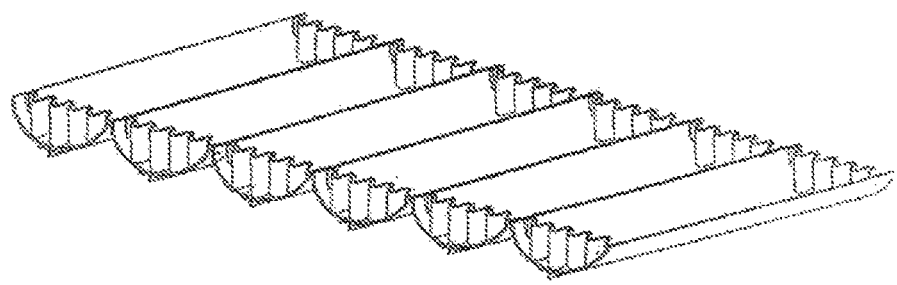
FIG. 2 is an isometric view of a second prior art conveyor belt disclosed in DE10149101.

In this specification:
  (i) Conveyor belt section means a single conveyor belt section that is not joined to any other conveyor belt section.
  (ii) "spaced equidistant" is intended to mean that the distance between peaks 20 and troughs 22 is constant. The prior art belt in FIG. 1 shows variable frequency between peaks and troughs (assuming that the flat sections are regarded as troughs). This is apparent when comparing the area of belt material making up the folds and flat sections.
  (iii) "Continuously" is intended to mean that peaks 20 and troughs 22 extend unbroken from a free end of a side wall 14, along the base 12, to the free end of the other side wall 16. The prior art belt in FIG. 2 shows peaks and troughs, but they are not continuous—for every four troughs in the side wall, there is a single trough in the base.

FIGS. 3 to 7 show sinusoidal corrugations. However, it will be appreciated that peaks 20 and troughs 22 can: (i) be connected by linear sections (not shown) to form triangular corrugations; or (ii) form an M-W (i.e. $^m{}_w{}^m{}_w$) cross-sectional shape. Drawing a midline MM through the peaks 20 and troughs 22 (i.e. at zero amplitude/intersecting the inflection points) in FIG. 3, the width of the peaks 20 at the midline $P_W$ is substantially equal to the width of the troughs 22 at the midline $T_W$. Put another way, the corrugations bisect the midline MM at regular intervals.

Figure 6:
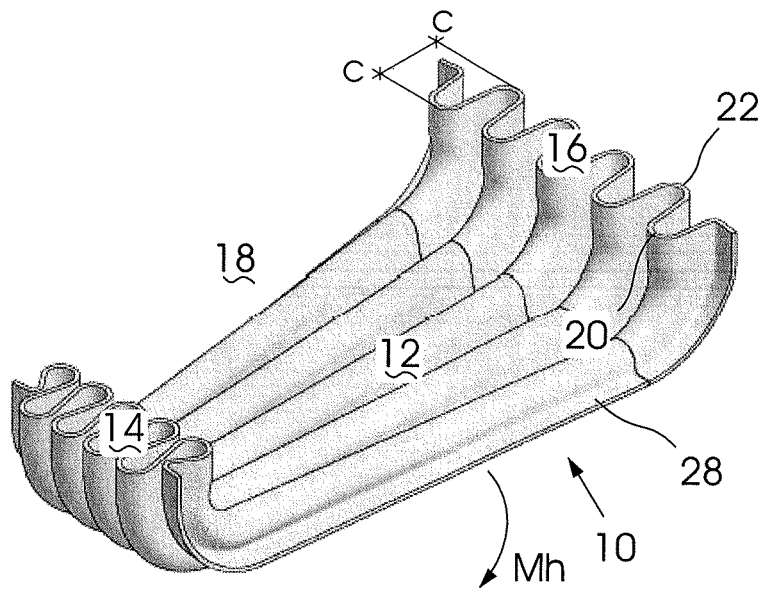
FIG. 6 is an isometric view of a portion of the conveyor belt section in FIG. 3 flexed sideways (i.e. horizontally)

FIG. 6 illustrates the affect of the sinusoidal corrugations. The conveyor belt section 10 is subject to a horizontal (i.e. side-to-side) bending moment Mh, causing the sinusoidal corrugations in sidewall 14 to compress and pack together and those in side wall 16 to expand and separate. Thereby, permitting the conveyor belt section 10 to bend horizontally in the direction of the bending moment Mh.

Similarly, should the conveyor belt section 10 be subject to a vertical downward (i.e. up-to-down) bending moment (illustrated as Mv in FIG. 4), the sinusoidal corrugations in the base 12 will compress and pack together, while the corrugations at the free ends of the side walls 14 and 16 will expand and separate. Thereby, permitting the conveyor belt section 10 to bend downwards.

It will be appreciated that, in use, the conveyor belt section 10 will bend, causing the corrugations to distort and the spacing between peaks 20 and troughs 22 to vary.

Figure 3:
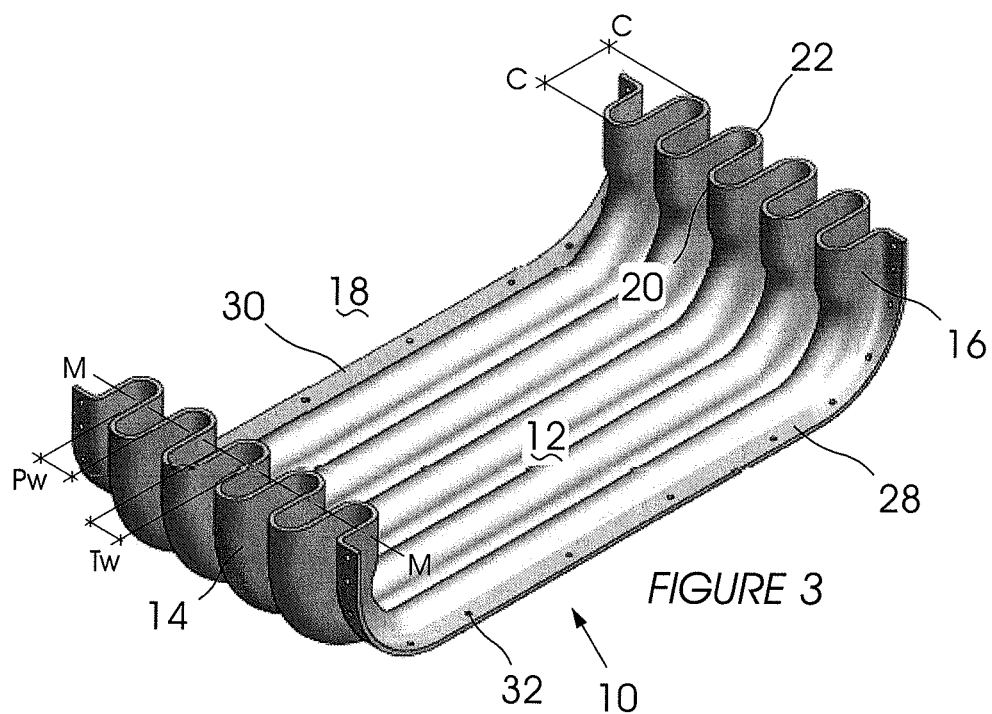
FIG. 3 is an isometric view of a conveyor belt section according to the invention.
Figure 4:
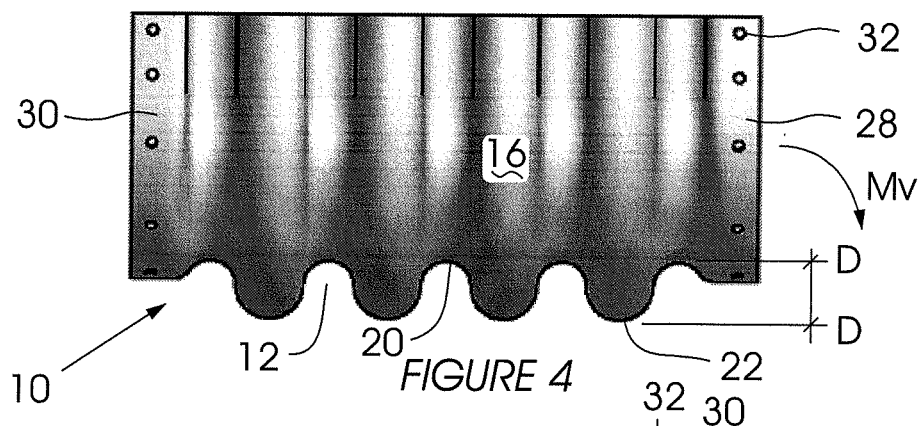
FIG. 4 is a side view of the conveyor belt section in FIG. 3.
Figure 5:
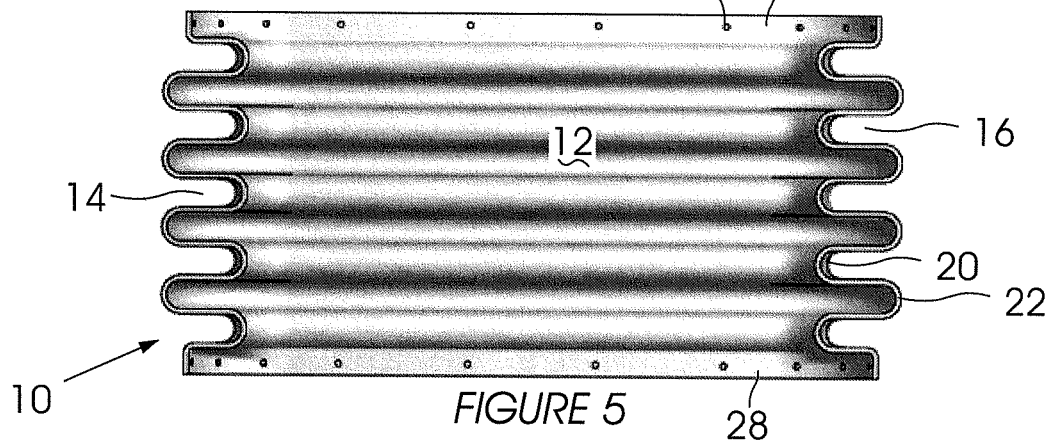
FIG. 5 is a top view of the conveyor belt section in FIG. 3.

The amplitude of the sinusoidal corrugations in the side walls 14 and 16, shown as C-C in FIG. 3 are greater than the amplitude of sinusoidal corrugations in the base 12, shown as D-D in FIG. 4. This increases the flexibility of the conveyor belt section 10 when bending vertically downwards in the direction of the bending moment Mv shown in FIG. 4.

Preferably, the amplitude of corrugations in sidewalls 14 and 16 increases proportionately along the length of the sidewalls from the base 12 to their free ends.

Figure 7:
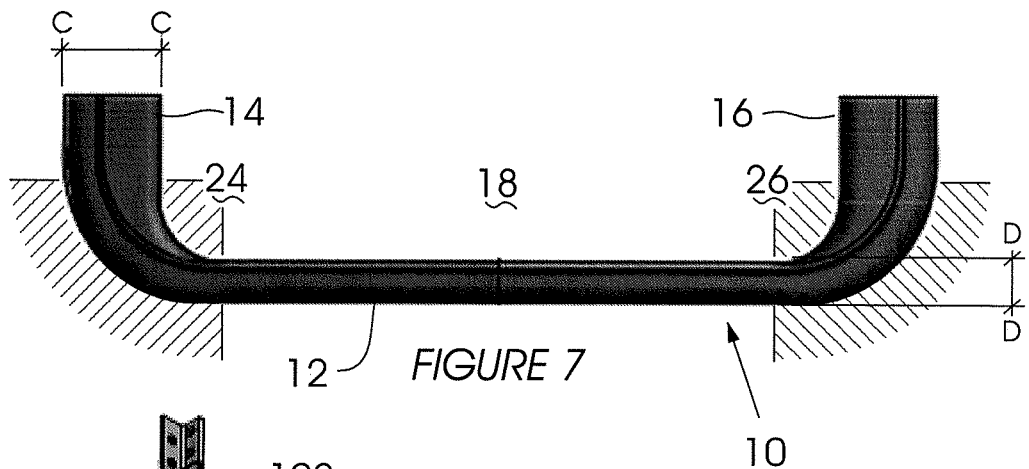
FIG. 7 is an end view of the conveyor belt section in FIG. 3.

With reference to FIG. 7, the conveyor belt section 10 includes arcuate transition sections 24 and 26 (shown as shaded portions) at the junctions of the base 12 and side walls 14 and 16. The arcuate transition sections 24 and 26 are moulded in the shape of an arc so as to support the side walls 14 and 16 substantially perpendicular to the base 12. Furthermore, to transition between the difference in amplitude C-C (also shown in FIG. 3) in the side walls 14 and 16 and amplitude D-D (also shown in FIG. 4) in the base 12, the amplitude of the sinusoidal corrugations in the arcuate transition sections 24 and 26 increases non-linearly along the arc from the intersection with the base 12 to the intersection with the side walls 14 and 16.

The: (i) amplitude of the sinusoidal corrugations; (ii) width of the base 12; and (iii) height of the side walls 14 and 16, depend on the type and volume of material being handled.

Referring back to FIGS. 3 to 5, the axial ends of the conveyor belt section 10 terminate in planar (in the sense that they are not sinusoidal), axially extending end sections 28 and 30 defining apertures 32 therein. As is evident in FIG. 4, these end sections 28 and 30 are located between, but spaced from the peaks 20 and troughs 22.

The conveyor belt section 10 is made from an elastomeric material, such as rubber or flexible plastic. Since the base 12 is generally subject to greater wear and tear than the side walls 14 and 16, the base 12 can be moulded out of a material with a greater flexibility and resistance to wear than the material forming the side walls 14 and 16 (not shown). Alternatively, the base 12 could be formed out of thicker material than the side walls 14 and 16 (not shown).

Figure 8:
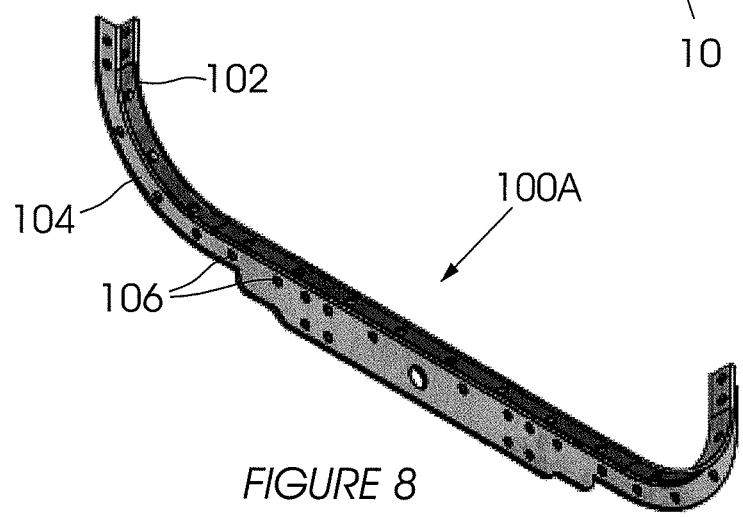
FIG. 8 is an isometric view of a flange used to connect conveyor belt sections shown in FIG. 3.
Figure 11:
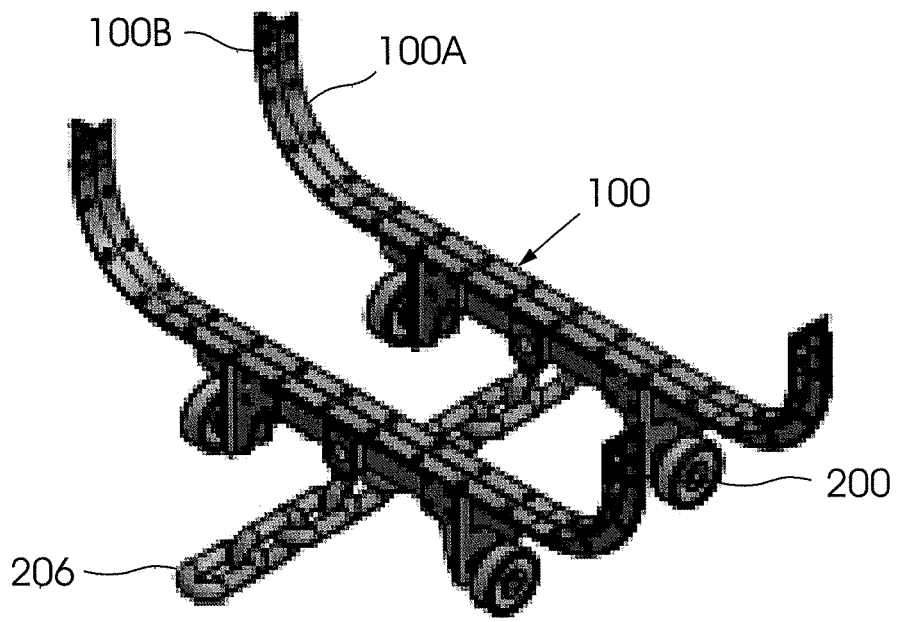
FIG. 11 is an isometric view of flanges with support wheels connected by a drive chain.

FIG. 8 shows a first component part (100A) of means 100 (shown in FIG. 11) for securing the conveyor belt sections 10 together. The first component part 100A is made from a metal L-shaped section having radial 102 and axial 104 flange plates that define apertures 106. The first component 100A is shaped to correspond to the cross sectional U-shape of the end sections 28 and 30 (as shown in FIG. 7). Referring to FIGS. 8 and 11, a second component part (100B) of the securing means 100 is a mirror image of the first component part 100A taken along the plane of the axial flange plate 104. The securing means 100 is formed by aligning the two component parts 100A and 100B with their axial flange sections 104 in facial contact and apertures 106 aligned to form a T-shaped section. Bolts are inserted through the aligned apertures 106 to secure the component parts 100A and 100B together.

Figure 9:
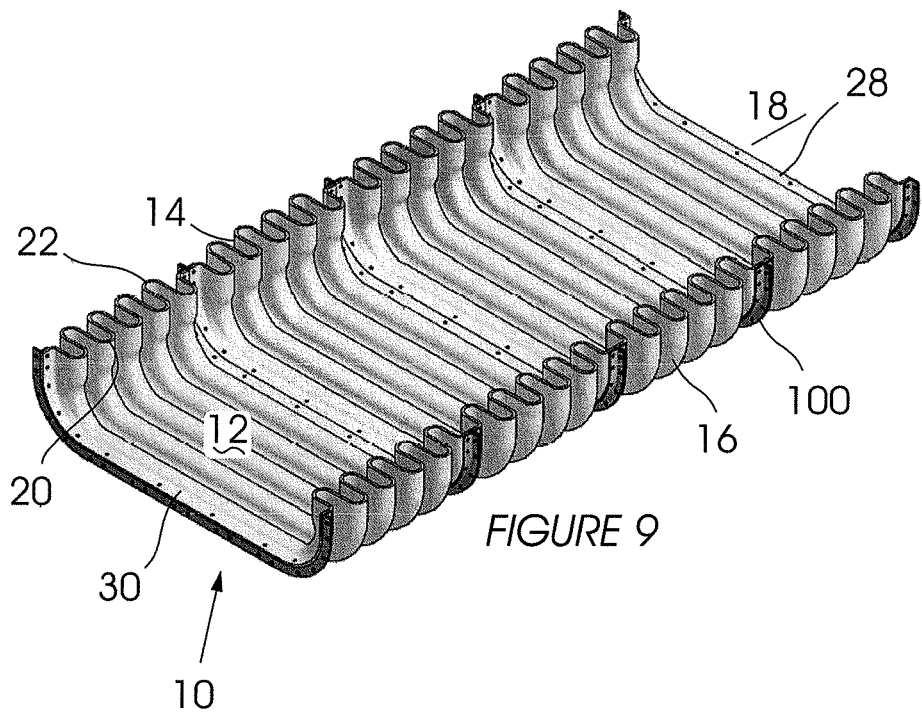
FIG. 9 is an isometric view of four conveyor belt sections shown in FIG. 3 connected by flanges shown in FIG. 8.

Referring to FIG. 9, to connect two conveyor belt sections 10 together and form a composite belt, the conveyor belt sections 10 are aligned axially with adjacent end sections 28 and 30 aligned. The securing means 100 is located over the outer peripheral wall of the adjacent end sections 28 and 30 with apertures 106 in the radial flange plate 102 of the securing means 100 and apertures 32 in the end sections 28 and 30 aligned. Bolts are inserted through the aligned apertures 106 and 36 to secure the conveyor belt sections 10 to the securing means 100. The depth of the axial flange plate 104 is sized so as not to extend past the virtual cylinder defined by the troughs 22 of the conveyor belt section 10.

Apart from connecting conveyer belt sections 10 together, the securing means 100 also reinforces the conveyor belt sections 10 and assists them to maintain their U-shape.

Figure 10:
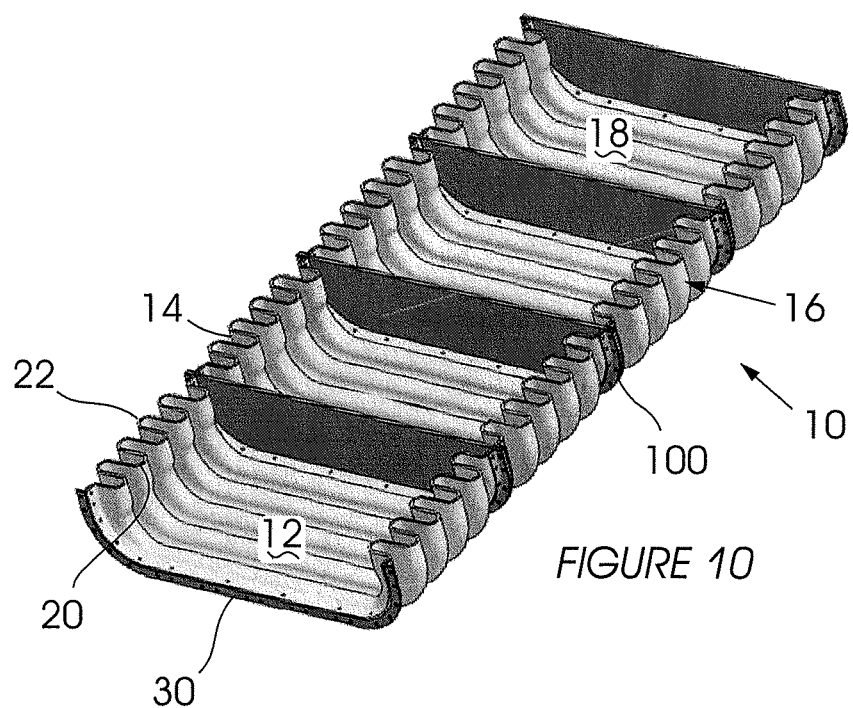
FIG. 10 is an isometric view of a composite conveyor belt comprising four conveyor belt sections shown in FIG. 3 with closure panels extending into the channels.

Turning to FIG. 10, a closure panel 108 can be secured between the axial flange plates 104 of the securing means 100 and extend into the channel 18 defined by the base 12 and side walls 14 and 16. In so doing, the closure panel inhibits or prevents communication between the channels of adjacent conveyor belt sections 10 and facilitates inclined transport of material (including mud) on the conveyor belt section 10.

Figure 12:
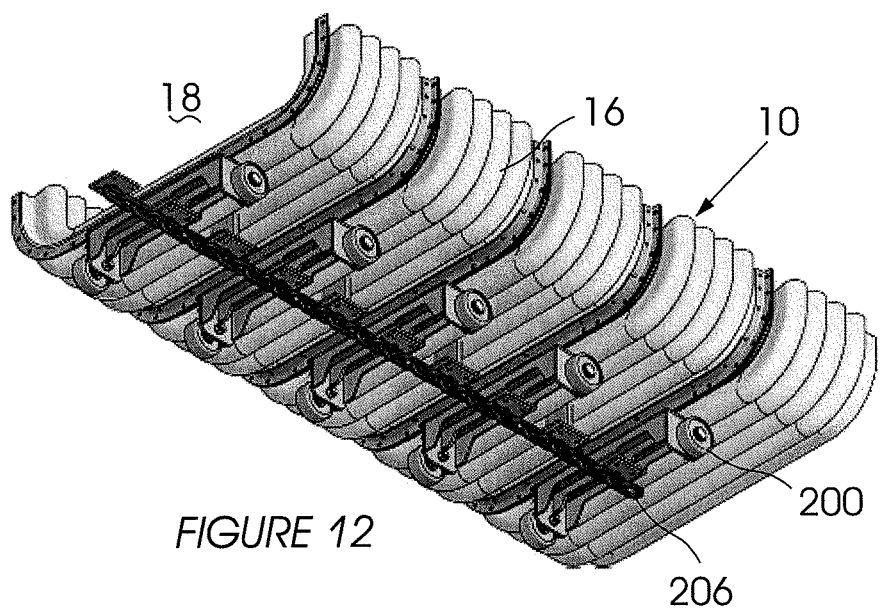
FIG. 12 is an isometric bottom view of a composite conveyor belt shown in FIG. 10 with support wheels attached.

FIG. 11 shows securing means 100 with support wheels 200 connected by a drive chain 206, and FIG. 12 show five conveyer belt sections 10 connected by such an arrangement.

The invention claimed is:
1. A conveyor belt section including:
a base;
first and second spaced apart opposing side walls extending angularly from opposing sides of the base to form a channel, each said first and second spaced apart opposing side wall having an inner surface and an outer surface and extending from the base from an operative lower end to a free operative upper end;
wherein the conveyor belt section is corrugated with at least two alternating peaks and troughs extending continuously from the free operative upper end of the first sidewall, via the operative lower end of the first sidewall, across the base, and via the operative lower end of the second sidewall to the free operative upper end of the second sidewall;
wherein the inner and outer surfaces of the first and second sidewalls define said alternating peaks and troughs that extend continuously from the operative lower end to the free operative upper end of each side wall;
wherein the corrugations are sinusoidal with alternating peaks and troughs spaced axially and equidistant along the conveyor belt section; and
wherein the corrugations have a width of the alternating peaks at a midline of the corrugations being substan- tially equal to a width of the alternating troughs at the midline of the corrugations.

2. A conveyor belt section according to claim 1, wherein an amplitude of the corrugations in the side walls is greater than an amplitude of the corrugations in the base.

3. A conveyor belt section according to claim 2, including an arcuate transition section at each junction of the base and side walls wherein an amplitude of the corrugations running across the arcuate transition section increases along the arc from the base to the side walls.

4. A conveyor belt section according to claim 3, wherein axial ends of the belt section terminate in planar, axially extending end sections.

5. A conveyor belt section according to claim 4, wherein the end sections are located between, but spaced from the peaks and troughs.

6. A conveyor belt section according to claim 5, wherein the conveyor belt section is made from an elastomeric material.

7. A conveyor belt section according to claim 6, wherein the base is made from an elastomeric material that has a higher wear resistance than the elastomeric material forming the side walls.

8. A conveyor belt section according to claim 6, wherein the side walls are made from an elastomeric material that is more resistant to fatigue than the material forming the base.

9. A composite conveyor belt including at least two conveyor belt sections according to claim 4 arranged with aligned end sections secured together by a securing means.

10. A composite conveyor belt according to claim 9, wherein the securing means comprises a flange and bolts extending between the end sections and flange.

11. A composite conveyor belt according to claim 10, including a closure panel at the junction of adjacent conveyor belt sections that extends into the channel defined by such belt sections to inhibit or prevent communication between the channels defined by the adjacent conveyor belt sections.

12. A composite conveyor belt including at least two conveyor belt sections according to claim 5 arranged with aligned end sections secured together by a securing means.

13. A conveyor belt section of a continuous flexible conveyor, said conveyor belt section comprising:
a belt section having a base, wherein said base includes opposing ends and opposing sidewalls extending upward from said base to first and second opposing free ends;
said belt section being corrugated with at least two alternating peaks and troughs extending continuously from the first free end, across said base, and to the opposing second free end;
said at least two alternating peaks and troughs spaced axially and equidistant along the belt section; and
wherein said at least two alternating peaks and troughs having a width of the said alternating peaks at a midline of said alternating peaks that is substantially equal to a width of said alternating troughs at a midline of said alternating troughs.

14. A conveyor belt section according to claim 13, wherein said peaks corrugated into said opposing sidewalls have an amplitude that is greater than an amplitude of said peaks corrugated into said base.

15. A conveyor belt section according to claim 14, including an arcuate transition section at each junction of said base and opposing side walls wherein an amplitude of said peaks running across an arcuate transition section increases along an arc from said base to said opposing side walls.

16. A conveyor belt section according to claim 13, wherein said opposing ends of said base terminate in planar, axially extending end sections.

17. A conveyor belt section according to claim 16, wherein the opposing end sections are spaced from said at least two alternating peaks and troughs.

18. A conveyor belt section according to claim 17, including at least two belt arranged with aligned end sections secured together by a securing means.

19. A conveyor belt section according to claim 18, wherein the securing means comprises a flange and bolts, said bolts extending between the end sections and flange.

20. A conveyor belt section according to claim 19, further including a closure panel aligned at a junction of adjacent belt sections that divides the adjacent belt sections.

* * * * *